H. THORNE.
AERIAL CABLEWAY CARRIER SYSTEM.
APPLICATION FILED JAN. 21, 1918.

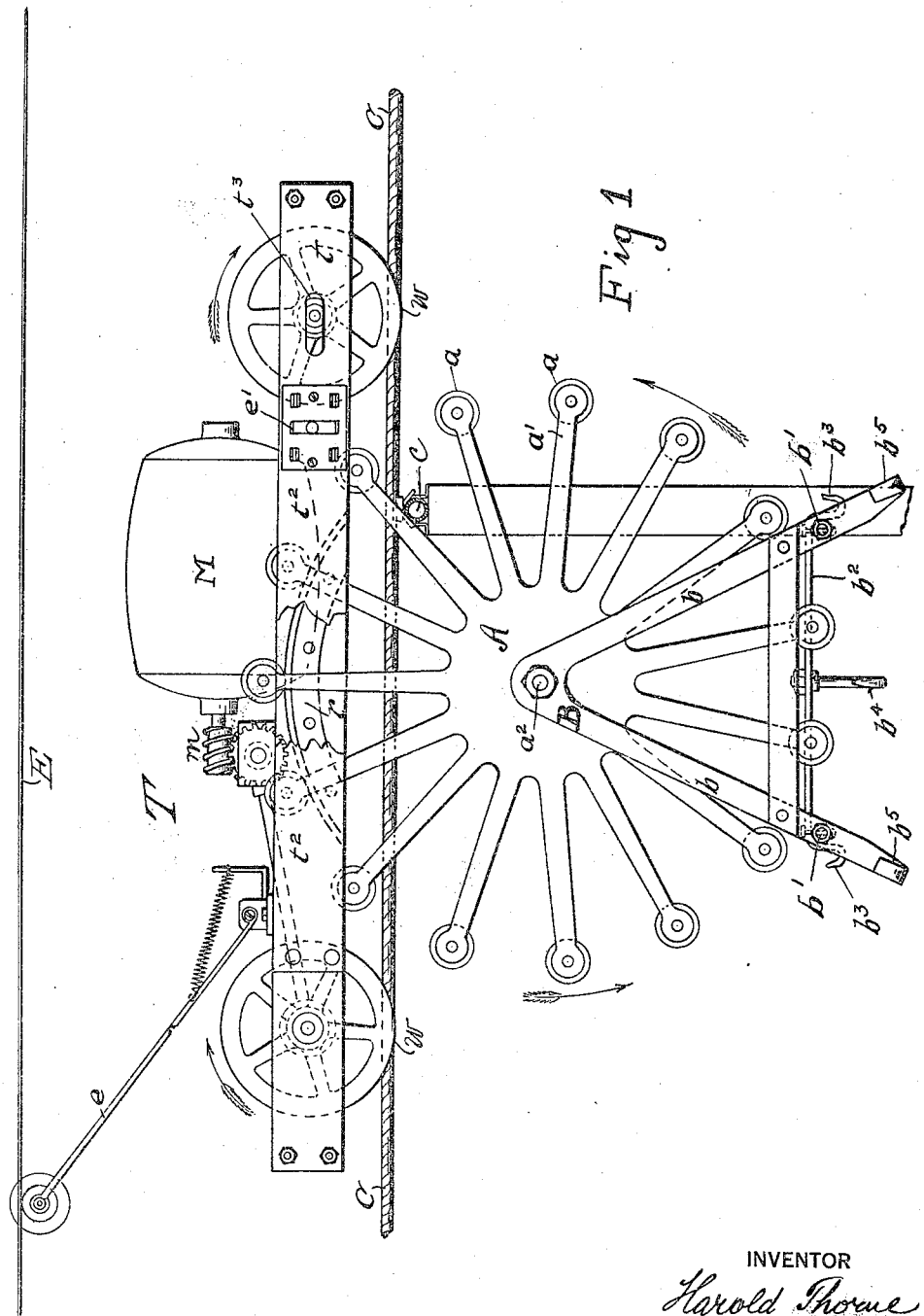

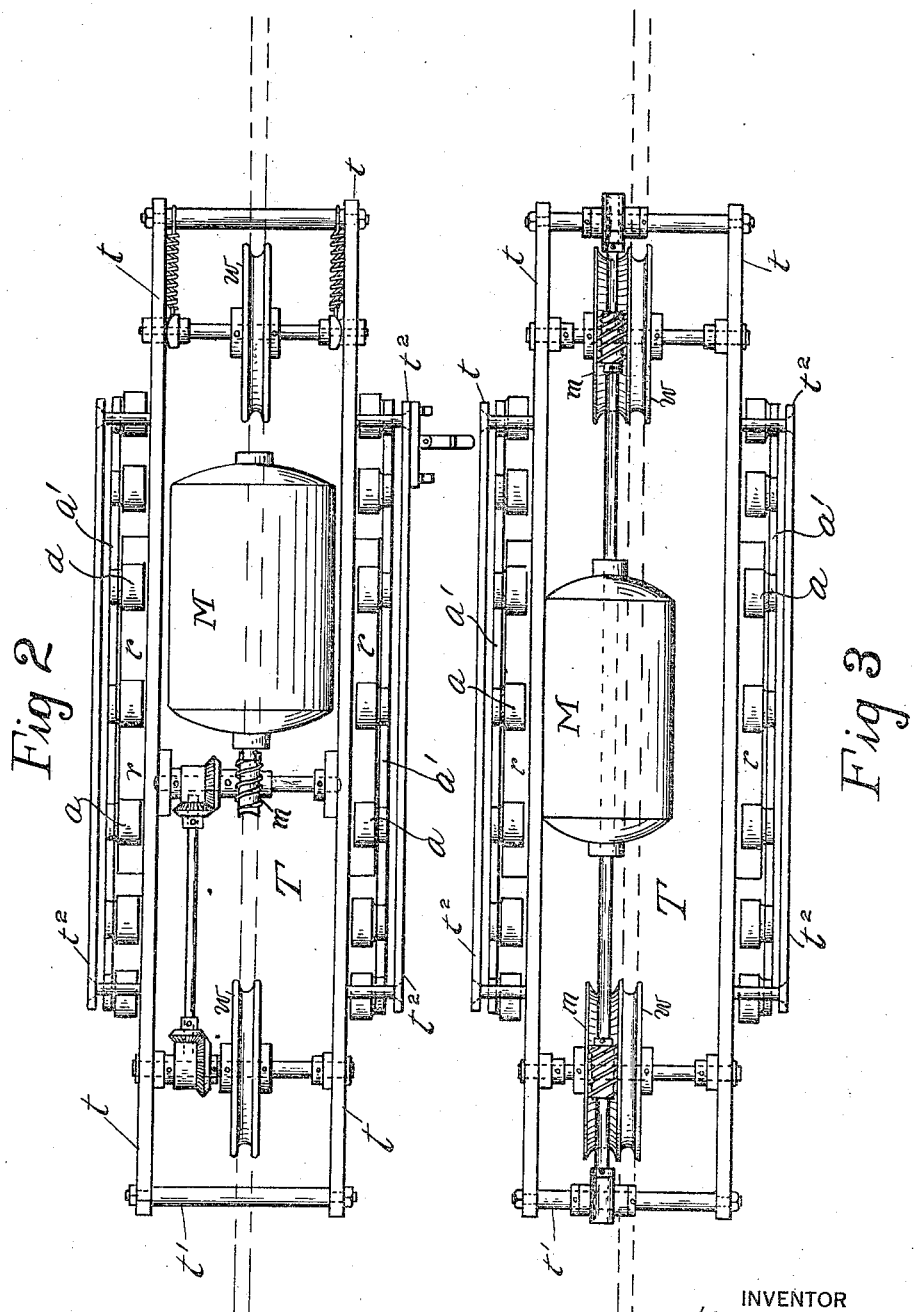

1,276,830.

Patented Aug. 27, 1918.
4 SHEETS—SHEET 3.

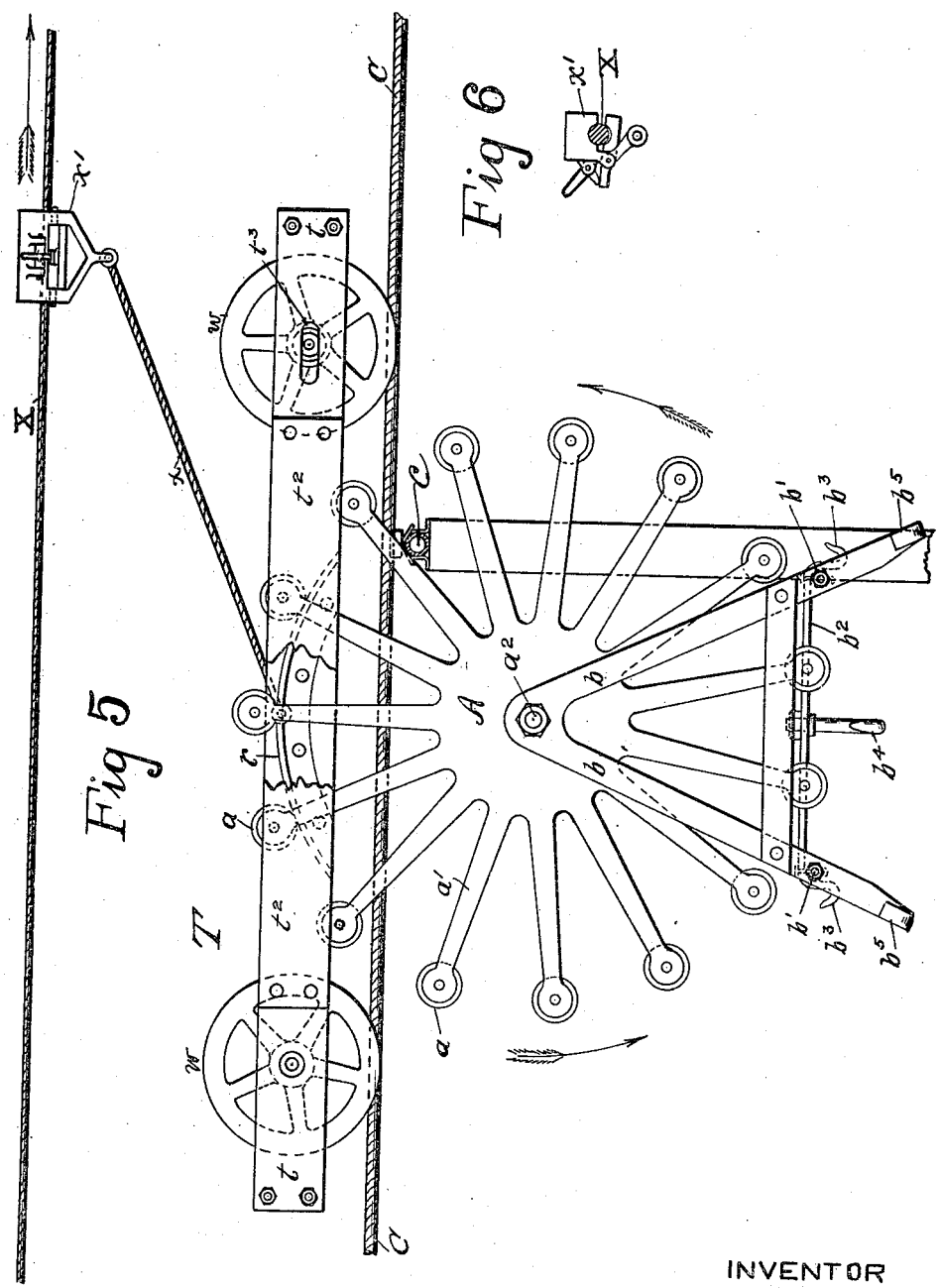

UNITED STATES PATENT OFFICE.

HAROLD THORNE, OF NEW YORK, N. Y.

AERIAL CABLEWAY CARRIER SYSTEM.

1,276,830.     Specification of Letters Patent.     Patented Aug. 27, 1918.

Application filed January 21, 1918. Serial No. 212,901.

*To all whom it may concern:*

Be it known that I, HAROLD THORNE, a subject of the King of England, and a resident of the borough of Manhattan, city, county, and State of New York, have invented certain new and useful Improvements in Aerial Cableway Carrier Systems, of which the following is a specification.

My improvements relate to overhead cable-way carrier systems generally, but particularly to those for use in logging and mining operations, the installation of impromptu lines of transportation for military purposes, and analogous uses where simplicity and cheapness of apparatus and plant are essential.

The object of the invention is the provision of a traveling carrier adapted to pass readily over transverse cross bars, guys, stays or the like attached to the track cable without impeding the speed, disturbing the load, or subjecting the parts to severe strain; and the invention consists in the specific construction, combination and arrangement of parts described and claimed, distinctive features being the method and means of supporting the burden suspenders on concentric bridge tracks on the truck; means for preventing the disengagement of the burden suspenders from the carrier truck; means for adapting the carrier truck to curvatures of the track cable; means for propelling the carrier truck on the track cable; the peculiar structure of the burden supporting frame, and other features hereinafter fully set forth.

In the accompanying drawings,

Figure 1, is a side elevation of a motor driven carrier embodying the essential features of my invention;

Fig. 2, is a plan of the parts shown in Fig. 1;

Fig. 3, is a plan of the carriage, showing a modification in the motor drive means;

Fig. 5, is a side elevation similar to Fig. 1, only showing the carriage operated by trolley and cable;

Fig. 6, is a detail of a trolley clutch adapted for the purpose.

Figure 4:
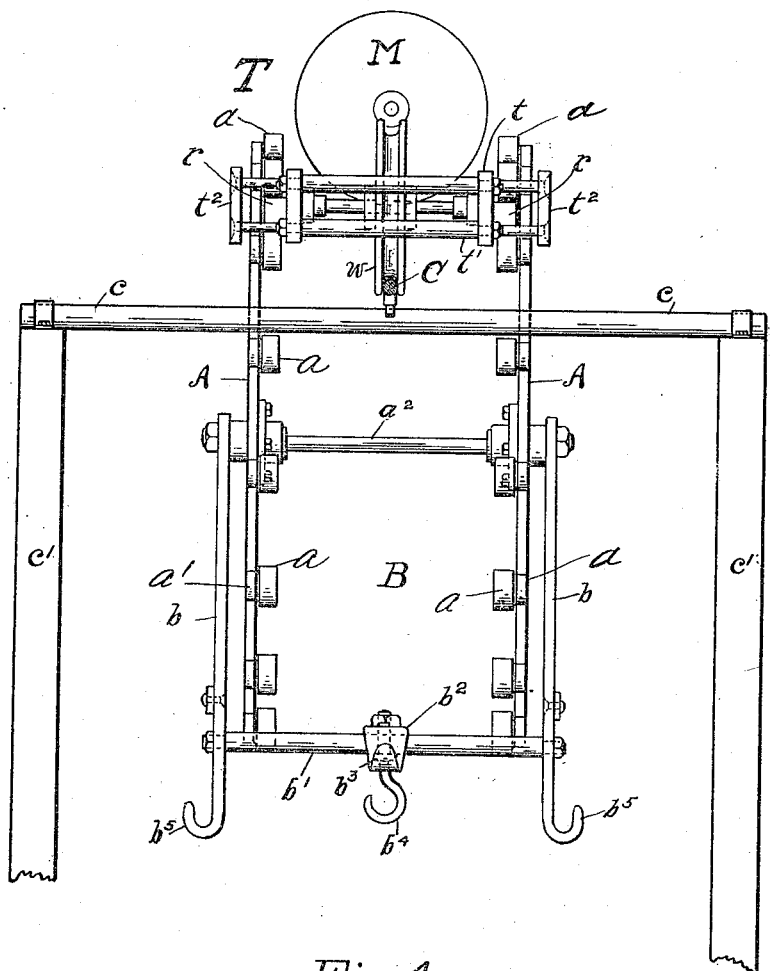
Fig. 4, is an end view of the construction shown in Fig. 1.

The truck T, comprises a main frame consisting of the longitudinal members $t, t$, and the transverse end members $t', t'$. Rigidly positioned medially on the outer sides of the longitudinal members $t, t$, are the concentric bridge rails $r, r$, over which travel the rollers $a, a$, pivotally mounted on the radial arms $a', a'$, of the rotatable spiders A, A, which perform the function of load suspenders, as hereinafter set forth. The bridge rails $r, r$, the contacting antifriction rollers $a, a$, and uppermost arms $a'$, of the suspender spiders A, are protected by outer side guard plates $t^2, t^2$, spaced apart from but rigidly attached to the longitudinal members $t, t$, of the truck frame T. These side guard plates prevent the displacement of the rollers contacting with the bridge rails, thereby preserving the alinement of all parts with relation to each other, and thus insuring the safety of the burden carried thereby.

Mounted upon and between the longitudinal side members $t$, of the truck frame are the traction wheels $w, w$, grooved peripherally to straddle the track cable C.

One or both of the axles of these traction wheels $w, w$, may be journaled in longitudinal slots $t^3$, to allow said wheels to adapt themselves to curvatures or variations in alinement of the track cable C.

The suspender spiders A, A, are both rigidly secured to the axle $a^2$, so as to rotate in unison; and their radial arms $a', a'$, are parallel and coincident in relationship, so that coincident arms $a'$, on each spider will encounter a transverse obstruction simultaneously,—such an obstruction being represented in the drawings by the transverse or lateral guy bar $c$, which is positioned beneath the cable C, and is supported on and between the posts $c'$.

It is to be understood in this connection that by the term lateral "guys" as used herein I mean to include any form of transverse stay or support for the track cable C, whether rigid or flexible.

Pivotally suspended on the extremities of the axle $a^2$, is a burden supporting frame B, of any desired or suitable character, that shown in the drawings consisting of triangular side members $b, b$, fulcrumed at their apices on said axle $a^2$, and connected below by transverse members $b', b'$, upon which latter is supported a central bar $b^2$, the ends of which overlap said transverse members $b', b'$, and are formed into bight hooks $b^3, b^3$. The central bar $b^2$, affords support for the main bight hook $b^4$. The lower ends of the triangular side members $b, b$, may also be formed into bight hooks $b^5, b^5$,—all these bight hooks being available for the attachment of the ropes or the like by which the burden is suspended upon and below said burden supporting frame B.

The carrier truck T, may be propelled along the track cable in either direction by any desired or available source of power, and by various mechanical expedients, so that I do not limit myself in this respect. As shown in the first four figures of the drawings M, represents symbolically an electric motor mounted on the carrier truck T,—E, in Fig. 1, being an electric cable parallel to the track cable C, e, a trolley connection of any kind, and e', a symbolical representation of a reversing switch for the motor M. In Figs. 1, and 2, a drive worm m, on the motor shaft actuates one of the traction wheels w, by means of intermediate gearing, as shown particularly in Fig. 2, while in the modification shown in Fig. 3, both traction wheels w, w, are actuated in like manner by drive worms m, m, on the motor shaft. In Figs. 5 and 6, the propulsion of the carrier truck T, by means of a trolley cable X, is shown, x, representing the flexible connection attached to the truck T, and to a suitable cable grip x'.

The operation of the suspender spiders A, A, will be readily understood. When coincidental arms a', a', on both suspender spiders A, A, encounter an obstruction, as the transverse guy bar c, the spiders yield under the pressure, rotating backward on the axle $a^2$, as indicated by the arrows in Figs. 1 and 5. As a result the guy bar is straddled, and the carrier passes freely beyond the obstacle c,—the rollers a, a, succeeding each other on the bridge rails r, and thereby sustaining the suspender spiders A, and the burden imposed thereon.

What I claim as my invention and desire to secure by Letters Patent is,

1. In an aerial cable-way carrier system of the character designated, in combination, an elevated track cable and lateral stay supports therefor, a carrier truck having traction wheels engaging said track cable and provided with concentric bridge rails, rotatable suspender spiders formed with radial arms adapted to engage successively with said concentric bridge rails on the carrier truck, said rotatable suspender spiders being axially connected to rotate in unison, and means pivotally mounted on the axis of said suspender spiders adapted to support a burden, for the purpose described.

2. In an aerial cable-way carrier system of the character designated, in combination, an elevated track cable and lateral stay supports therefor, a carrier truck having traction wheels engaging said track cable and provided with concentric bridge rails, rotatable suspender spiders formed with radial arms provided with rollers adapted to engage successively with said concentric bridge rails on the carrier truck, said rotatable suspender spiders being axially connected to rotate in unison, and means pivotally mounted on the axis of said suspender spiders adapted to support a burden, for the purpose described.

3. In an aerial cable-way carrier system of the character designated, in combination, an elevated track cable and lateral stay supports therefor, a carrier truck having traction wheels engaging said track cable and having parallel side members supporting concentric bridge rails, rotatable suspender spiders formed with radial arms on which anti-friction rollers are mounted adapted to engage successively with said concentric bridge rails on the carrier truck, guards on the latter adapted to prevent the displacement of the spider arms in engagement with said bridge rails, said rotatable suspender spiders being axially connected to rotate in unison, and means pivotally mounted on the axis of said suspender spiders adapted to support a burden, for the purpose described.

4. In an aerial cable-way carrier system of the character designated, in combination, an elevated track cable and lateral stay supports therefor, a carrier truck having traction wheels engaging said track cable, one of said traction wheels being mounted on an axle journaled in slot bearings in the frame of the truck to allow the latter to adapt itself to variations in alinement of the track cable, concentric bridge rails on each side of the truck, rotatable suspender spiders formed with radial arms provided with rollers adapted to engage successively with said concentric bridge rails on the carrier truck, said rotatable suspender spiders being axially connected to rotate in unison, and means pivotally mounted on the axis of said suspender spiders adapted to support a burden, for the purpose described.

5. In an aerial cable-way carrier system of the character designated, in combination, an elevated track cable and lateral stay supports therefor, a carrier truck having traction wheels engaging said track cable, a motor on said truck, mechanism for driving one of said traction wheels by means of said motor, concentric bridge rails on said truck, rotatable suspender spiders formed with radial arms adapted to engage successively with said concentric bridge rails on the carrier truck, said rotatable suspender spiders being axially connected to rotate in unison, and means pivotally mounted on the axis of said suspender spiders adapted to support a burden, for the purpose described.

6. In an aerial cable-way carrier system of the character designated, in combination, an elevated track cable and lateral stay supports therefor, a carrier truck having traction wheels engaging said track cable, a motor on said truck, mechanism for driving both of said traction wheels by means of said motor, concentric bridge rails on said truck, rotatable suspender spiders formed with radial arms adapted to engage successively with said concentric bridge rails on the carrier truck, said rotatable suspender spiders being axially connected to rotate in unison, and means pivotally mounted on the axis of said suspender spiders adapted to support a burden, for the purpose described.

7. In an aerial cable-way carrier system of the character designated, an elevated track cable and lateral stay supports therefor, a carrier truck having traction wheels engaging said track cable, means for propelling said carrier truck along said track cable, concentric bridge rails on said carrier truck, rotatable suspender spiders formed with radial arms adapted to engage successively with said concentric bridge rails on the carrier truck, said rotatable suspender spiders being axially connected to rotate in unison, and means pivotally mounted on the axis of said suspender spiders adapted to support a burden, for the purpose described.

8. In an aerial cable-way carrier system of the character designated, in combination, an elevated track cable and lateral stay supports therefor, a carrier truck having traction wheels engaging said track cable, and provided with concentric bridge rails, rotatable suspender spiders formed with radial arms adapted to engage successively with said concentric bridge rails on the carrier truck, said rotatable suspender spiders being axially connected to rotate in unison, and a burden supporting frame pivotally mounted on the axis of said rotatable suspender spiders and comprising triangular side members connected by transverse members sustaining a central bight hook, for the purpose described.

9. In an aerial cable-way carrier system of the character designated, in combination, an elevated track cable and lateral stay supports therefor, a carrier truck having traction wheels engaging said track cable, and provided with concentric bridge rails, rotatable suspender spiders formed with radial arms adapted to engage successively with said concentric bridge rails on the carrier truck, said rotatable suspender spiders being axially connected to rotate in unison, and a burden supporting frame pivotally mounted on the axis of said rotatable suspender spiders and comprising triangular side members connected by transverse members sustaining a central bight hook, said burden support frame being also formed with bight hooks on the lower extremities of each of its triangular side members, for the purpose described.

10. In an aerial cable-way carrier system of the character designated, in combination, an elevated track cable and lateral stay supports therefor, a carrier truck having traction wheels engaging said track cable, a traveling cable substantially parallel to said track cable, a trolley clutch connected with said carrier truck and adapted to positively engage said traveling cable, concentric bridge rails on said carrier truck, rotatable suspender spiders formed with radial arms adapted to engage successively with said concentric bridge rails on the carrier truck, said rotatable suspender spiders being axially connected to rotate in unison, and means pivotally mounted on the axis of said suspender spiders adapted to support a burden, for the purpose described.

11. In an aerial cable-way carrier system of the character designated, in combination, an elevated track cable and lateral stay supports therefor, a carrier truck having traction wheels engaging said track cable, and provided with concentric bridge rails, rotatable suspender spiders formed with radial arms adapted to engage successively with said concentric bridge rails on the carrier truck, and means pivotally mounted on the axis of said suspender spiders adapted to support a burden, for the purpose described.

HAROLD THORNE.

Witnesses:
 GEO. WM. MIATT,
 DOROTHY MIATT.

Copies of this patent may be obtained for five cents each, by addressing the "Commissioner of Patents, Washington, D. C."